Oct. 26, 1954  E. J. DEUSTER  2,692,451
ANIMATED FISH LURE
Filed April 5, 1951
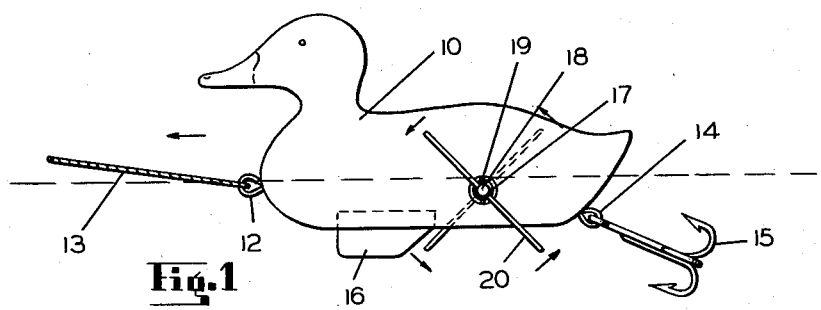
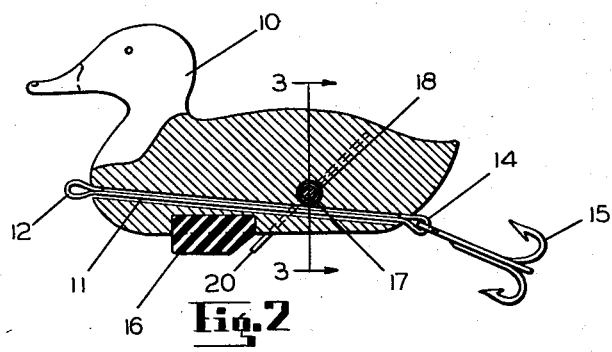
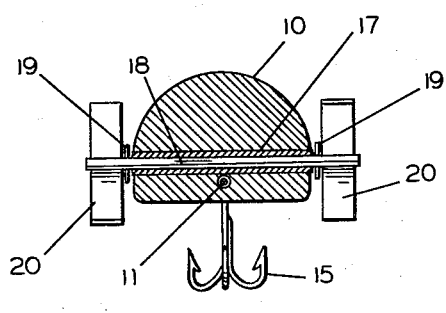
INVENTOR.
ELMER J. DEUSTER
BY
ATTORNEY.

Patented Oct. 26, 1954

2,692,451

UNITED STATES PATENT OFFICE 2,692,451

ANIMATED FISH LURE

Elmer J. Deuster, Milwaukee, Wis.

Application April 5, 1951, Serial No. 219,395

1 Claim. (Cl. 43—42.13)

My invention relates to fish lures, and more particularly to a surface bait employed in the art of fishing, a bait that is animated in its path over the surface of the water when being urged toward the user.

An object of my invention is to provide a lure that may be constructed of any type of fanciful body design, in which the structure is provided with a paddle wheel on both sides thereof, and wherein the blades are in opposite angular relation to one another, and mounted onto a shaft journaled within the body of the device.

Another object of my invention is to provide a lure of any fanciful design, whereby the body portion will agitate the surface of the water in its movement during the retrieving operation.

Still another object of my invention is to provide a simple constructed lure, that requires a single shaft extending laterally through the body of the device, thereby permitting the mounting of conventional hooks or the like.

A further object of my invention is to provide a device of the character described that is weighted at its lower portion to assure its correct position on the surface of the water during its manipulation.

It is manifest to anyone familiar with casting fishing lures, that there are surface baits that remain on the surface of the water while being retrieved during the casting operation. The action and movement of the bait or lure determines its desirability for various species of fish.

The device illustrated, specified and claimed herein is a surface lure that, due to its weighted keel, will adjust itself to the correct position when it is disposed on the surface of the water during the casting operation, and as it is retrieved, it will be actuated by the water to a point where it agitates the surface, and assumes the action of a swimming object.

The device is extremely simple in construction, yet highly efficient for the purpose for which it is intended.

Other and further objects of my invention will become more apparent as the description proceeds, when taken in conjunction with the drawing in which:

Figure 1 is a side elevation of the assembled device disposed on the surface of the water.

Figure 2 is a longitudinal cross-sectional view of the assembled device showing the various features inserted therein, and Figure 3 is a lateral cross-section of the assembled device taken at the line 3—3 in Figure 2.

Similar characters of reference indicate corresponding parts throughout the several views, and referring now to the same, the character 10 shows a body of buoyant material which, obviously, may be of any shape, form or contour, and may be constructed into any fanciful design, and may be either hollow or solid in its structure.

This body 10 acts as a mounting for a longitudinally disposed link member shown as 11 which is provided with a loop 12 at its forward end for engagement with a fishing line shown as 13, and a loop portion 14 at its rearward end for engagement with a treble hook 15, or any other desirable hook means. Obviously, the hook arrangement may vary to suit the particular type of lure being manufactured.

The body 10 is also provided with a keel 16 extending downward therefrom. This keel is constructed of a heavy material, and is employed to retain the buoyant body 10 in proper position on top of the surface of the water while the bait is being manipulated.

I also show a tubular member 17 extending laterally through the entire body 10. This tubular member 17 acts as a bearing for a shaft 18 which extends through the tube 17 outward from the body 10 on both sides and is provided with paddle members 17 extending outward from the shaft in opposite relation to one another.

There are washers 19 shown inserted over the shaft 18 between the paddles 20 and the body 10 of the device. By putting the paddles in opposite angular relation to one another, it is possible to, at all times, have one blade of the paddle in the water so that in the actuation of the paddle due to the movement of the lure, the shaft will be revolved, bringing the blade of the paddle wheel on the opposite side of the bait in the position where it will be actuated by contact with the water.

In the chosen embodiments of my invention, exemplified by the accompanying drawing, there are many features not heretofore disclosed in the prior art. The simplicity of the device makes for easy manufacture and economic structure, and the movement of the paddle members will provide a steady actuation of the surface of the water while the bait is being retrieved.

Although I have shown a single structure and arrangement of parts, I am fully cognizant of the fact that many changes in the form and configuration of the device may be made without affecting its operativeness, or without affecting the spirit of the invention or the scope of the appended claim.

Having thus described my invention, what I claim and desire to secure by Letters Patent in the United States is:

A fishing lure comprising a buoyant body member having the external configuration of a living creature and being of solid construction, a link carried by said body member and upwardly inclined in a forward direction so that the front of the link is above the rear of the link, said link having a loop member at the forward end of said body member for attachment of a fishing line whereby the lure is adapted to be pulled through water by the line, said link having a loop at its rear end for securement of a hook, said loop being arranged exteriorly of said body member, a tubular bearing member extending transversely of said body member forwardly of the rear end of the buoyant body member, said bearing being positioned below the medial longitudinal axis of the body member, the ends of said bearing being flush with the outer sides of said body member, a shaft journalled within said tubular bearing and being of a length to project beyond the ends thereof, a paddle member secured to respective ends of said shaft, and said paddle members each including a flat strip, said strips being disposed in opposite angular relation to one another, said paddle members being arranged exteriorly of said body member, securing elements interposed between said paddle members and the adjacent ends of said bearing member, said bearing member being arranged contiguous to the upper surface of said link, there being a recess in the under surface of said body member forwardly of said bearing, and a weighted keel secured in said recess and projecting downwardly below the bottom of said body.

References Cited in the file of this patent

UNITED STATES PATENTS

| Number | Name | Date |
|---|---|---|
| 1,313,476 | Ewert | Aug. 19, 1919 |
| 1,426,283 | Ewert | Aug. 15, 1922 |
| 1,539,436 | Shaw | May 26, 1925 |
| 1,854,520 | Medvedeff | Apr. 19, 1932 |
| 1,977,141 | Pfleuger | Oct. 16, 1934 |
| 2,229,175 | Johnson | Jan. 21, 1941 |
| 2,339,983 | Day | Jan. 25, 1944 |
| 2,391,109 | Van Patten | Dec. 18, 1945 |
| 2,490,248 | Barthel | Dec. 6, 1949 |
| 2,517,962 | Bastie | Aug. 8, 1950 |